(No Model.)
W. E. DAVIS.
TELEGRAPH RELAY AND SOUNDER.
No. 248,089. Patented Oct. 11, 1881.
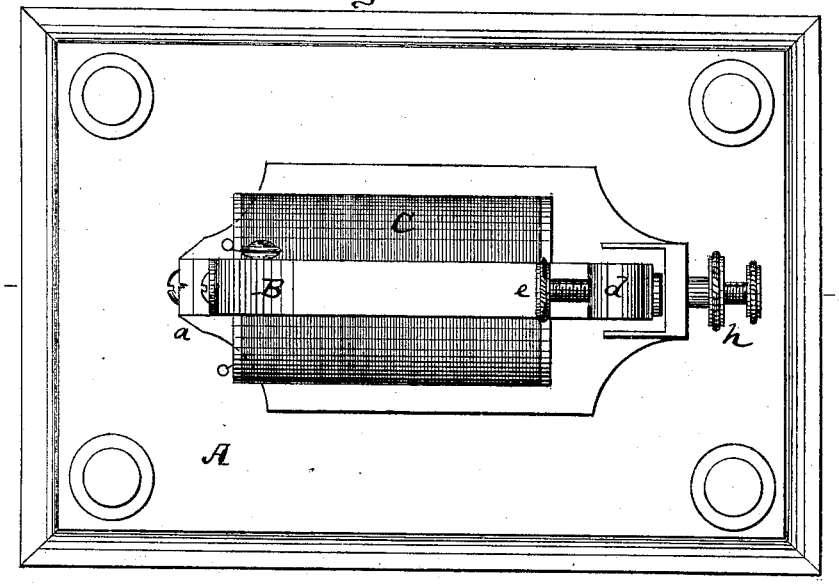
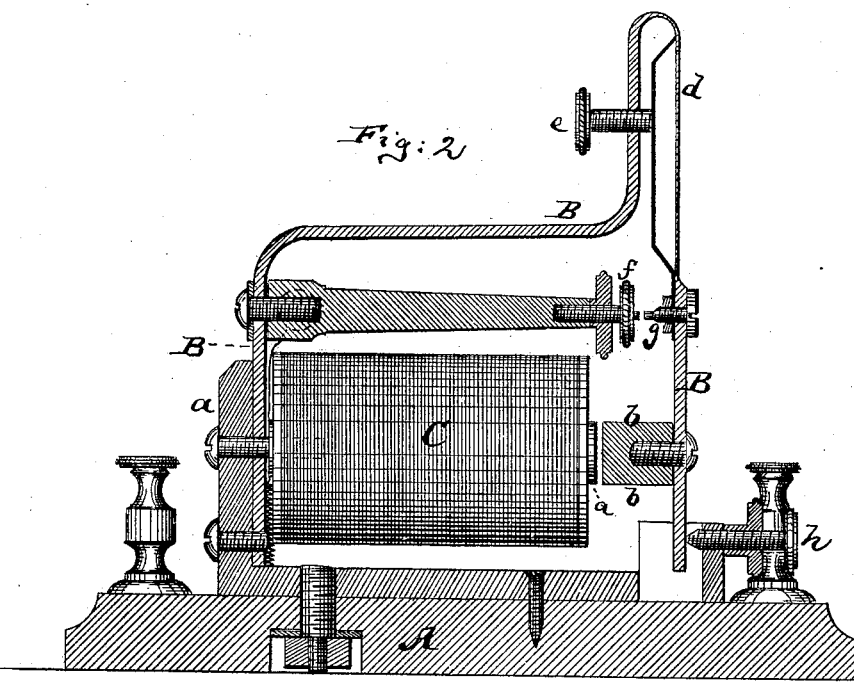
Witnesses
John C. Tunbridge
Henry F. Parker.
Inventor:
William E. Davis,
by his Attorney,

UNITED STATES PATENT OFFICE.

WILLIAM E. DAVIS, OF JERSEY CITY, NEW JERSEY.

TELEGRAPH RELAY AND SOUNDER.

SPECIFICATION forming part of Letters Patent No. 248,089, dated October 11, 1881.

Application filed January 7, 1881. (No model.)

*To all whom it may concern:*

Be it known that I, WILLIAM E. DAVIS, of Jersey City, in the county of Hudson and State of New Jersey, have invented a new and Improved Telegraph Relay and Sounder, of which the following is a specification.

This invention relates to an improvement in telegraph-instruments, and results from experiments with the relay and sounder which is described in Letters Patent No. 233,214, granted me October 12, 1880. In that patent the two spools of an electro-magnet were attached to the ends of an elastic keeper, so that one of the spools would be attracted to the other whenever the electro-magnet was charged.

By my present invention I do away with one of the spools, and I produce an electro-magnet having a single spool and placed upon a core, of which an extension reaches opposite to the pole of that spool and forms the other pole of the magnet. In other words, the theory of my invention is that I take an approximately horseshoe-shaped iron keeper, made elastic to permit one pole to approach the other, and I wind around one of the poles of this horseshoe the wire which connects with the battery. When the current passes through this wire the soft-iron horseshoe becomes magnetized and the spool-pole will then attract the other pole; but when the current ceases the spring of the iron will cause the poles to separate, and thus the reciprocating action which, in the ordinary instrument, is imparted to the device usually termed "armature" is here obtained without the necessity of a separate plate, and practically by the action of the magnet itself.

For the more complete explanation of my invention I point to the accompanying drawings, in which Figure 1 represents a top view of a relay or sounder constructed according to my invention, and Fig. 2 a side elevation, partly in section, of the same.

The letter A is the bed-plate of the instrument. This bed-plate carries, by means of a suitable post, $a$, the iron bar or plate B, which, although made of separate pieces, nevertheless is a continuous soft-iron structure that extends from the one pole, $a$, to the other pole, $b$. This soft-iron bar B has part of it formed into a spring, as at $d$, the spring being so constructed as to normally hold the poles $a\,b$, which are opposite and near each other, as shown, apart. The power of this spring can be suitably regulated by means of a screw, $e$, or in any other suitable manner. The portion of this soft-iron bar which is nearest the pole or end $a$ is surrounded by a coil, C, of wire, which coil is connected with the battery and ground in the usual manner, so that when a current is passed over it the entire bar B will be magnetized, the poles $a\,b$ thereby drawn together. When the current ceases magnetism ceases also in the bar B and the spring $d$ draws the poles again apart.

It is, of course, immaterial as to which of the two ends of this bar B carries the coil, as long as the spring $d$ or an equivalent weight has sufficient power to hold the poles apart normally, but not of sufficient power to prevent the magnetism when the current is established from drawing them together.

It will be seen that thus without a separate armature, without necessarily employing two spools, and without more than the single soft-iron bar or plate, I am enabled to obtain all the functions of an electro-magnet and its ordinary armature for the transmission of telegraphic messages, either in form of sounder or of a relay. For the purpose of a relay the connection shown at $f\,g$ is made. For the purpose of regulating the play of the movable portion of the bar B the set-screw $h$ is employed.

I am aware that permanent magnets having a coil upon one of their poles have already been suggested for use in telephones. This I do not claim.

I claim—

In a telegraph-instrument, the non-magnetized iron bar B, containing the spring $d$ and shaped to form the poles $a\,b$, which are opposite and near each other, in combination with the spool C, placed only upon one end of said bar B, and with the screw $h$, bearing against the other end thereof, all arranged so that by the combined action of said bar B, spool C, spring $d$, and screw $h$ the instrument will operate as a sounder or relay, substantially as herein shown and described.

WILLIAM E. DAVIS.

Witnesses:
WILLY G. E. SCHULTZ,
WILLIAM H. C. SMITH.